Jan. 3, 1939. D. A. C. ZOETHOUT 2,142,625
HIGH TENSION CABLE
Filed July 6, 1933
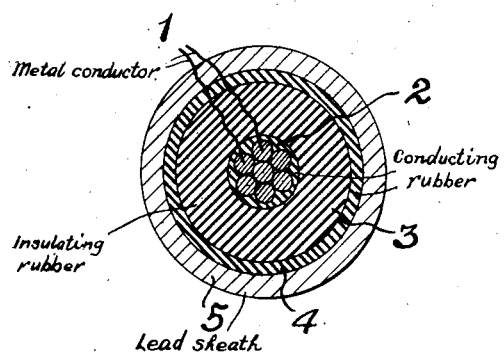
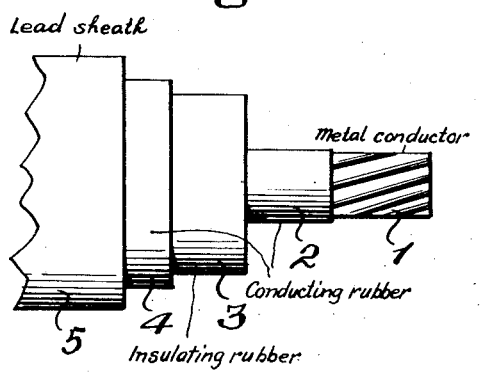
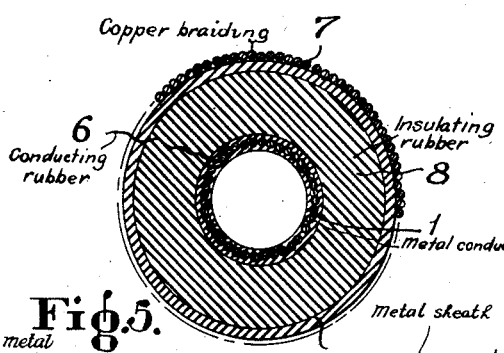
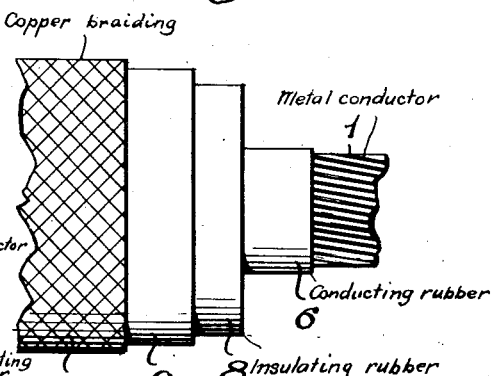
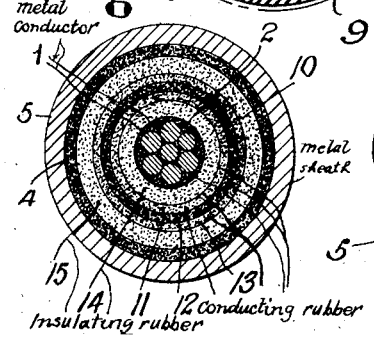
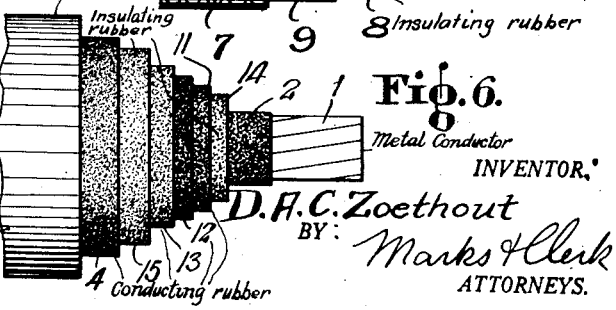
INVENTOR.
D. A. C. Zoethout
BY Marks & Clerk
ATTORNEYS.

Patented Jan. 3, 1939

2,142,625

UNITED STATES PATENT OFFICE 2,142,625

HIGH TENSION CABLE

Daniël Allard Coert Zoethout, Driehuis-Westerveld, Netherlands, assignor to N. V. Hollandsche Draad-en Kabelfabriek, Amsterdam, Netherlands Application July 6, 1933, Serial No. 679,168
In the Netherlands July 6, 1932

6 Claims. (Cl. 173—264)

Rubber for use as a high voltage insulating material, in particular for high voltage cables, has been rendered possible by the application of rubber, which has been made conductive, as intermediary layer between the insulation and the metallic conductors, that is to say as part of the conductor. By effecting a thorough adhesion between the conductive rubber and the insulation the major objection to the use of rubber, viz. ionization and the formation of ozone, is overcome.

As appears from the results previously obtained it has not been recognized that the conductive rubber has to satisfy certain sharply defined conductive properties and that a resistance of the conductive rubber layers, which is small in comparison to the resistance of the insulation, is not sufficient.

The subject of the invention is the novel feature, that the resistance of the conductive rubber has to lie below a definite limit. Moreover the invention provides means for obtaining the said resistance, which is relatively low. Finally it has appeared, that the combination of an insulating substance and the insulating substance which has been rendered conductive, so as to show a definite maximum resistance, need not be limited to rubber. Any insulating material resembling rubber and also synthetic materials, such as synthetic rubber and flexible resins, may be applied according to the same principle.

The present invention can be described more specifically by reference to the accompanying drawing in which there are shown, more or less diagrammatically, several illustrative types of cables within the purview of the present invention. In this showing:

Fig. 1 is a cross section of a cable insulated with rubber and provided with layers of conducting rubber in accordance with the present invention, Fig. 2 is an elevation of the cable shown in Fig. 1, with the various layers making up the cable being cut away to show the internal construction, Fig. 3 is a cross section of a flexible cable provided with a hollow core and layers of conducting rubber, Fig. 4 is an elevation of the cable shown in Fig. 3 with the layers cut away to show the internal construction, Fig. 5 is a cross section of a third type of cable, this type being provided with a plurality of intermediate, adjacent layers of conducting rubber, while Fig. 6 is an elevation of the cable shown in Fig. 5, with the various layers cut away to show the construction.

In the various figures the central metallic conductor is designated by reference numeral 1. In Figs. 1, 2, 5 and 6, this conductor is shown imbedded in a layer 2 of conducting rubber, while in Figs. 3 and 4 a conducting rubber layer 6 is shown surrounding the braided conductor which is employed in the flexible type of cable. In the cable of Figs. 1 and 2 the central layer 2 of the conducting rubber is surrounded with a layer 3 of insulating rubber, which in turn is covered with a layer 4 of conducting rubber. The latter layer is enclosed in the lead sheath 5.

In the cable of Figs. 3 and 4 an intermediate layer 8 of insulating rubber is provided, this layer being covered with a layer 9 of conducting rubber. A braided copper sheath 7 encloses this cable.

In the cable of Figs. 5 and 6, a layer 14 of insulating rubber surrounds layer 2 of conducting rubber. Then an assembly of three adjacent layers, 11, 12 and 13 of conducting rubber are provided, the specific resistances of these layers being usually selected in such manner that the center layer 12 has a resistance considerably below 1 megohm per cubic centimeter and the specific resistance of the layers 11 and 13 is higher but still below 1 megohm per cubic centimeter. A layer 15 of insulating rubber is provided on the outside of layer 13. It is thus seen that the assembly of conducting rubber layers, 11, 12 and 13, is united on either side to insulating rubber layers and that the resistances of the conducting rubber layers is graded in such fashion that the resistance increases toward the insulating rubber. Although an assembly of only 3 conducting rubber layers is shown in the drawing, it will be understood that any number of these layers may be employed, so long as their specific resistances are graded from an inner conducting layer towards the insulating rubber layers. The insulating rubber layer 15 is covered with a layer 4 of conducting rubber. And the assembly as a whole is enclosed in the metal sheath 5, as in the case of the cable shown in the other figures.

The combination: conductive layer-insulating layer-conductive layer may be considered as a series connection of a resistance, a condenser and a resistance. In the resistances a certain voltage will be absorbed by the charging current of the condenser, which flows through the resistance. This voltage is in phase with the charging current, whereas the voltage in the condensor lags substantially 90° with regard to the charging current. An energy component of the voltage and a wattless component of the voltage may be distinguished, the quotient of these being the tangent of the complement of the phase angle between the voltage and the charging curent, which is caused by the resistance of the conductive layers. In other words the resistance of the conductive layers determines the increase of the tangent of the loss angle δ (delta) of the insulating material.

Indeed to this tangent the quotient of the energy component of the voltage in the conductive layers and the wattless component of the voltage in the insulating layer should be added. Now rubbers have already been made, which possess a value of tg δ=0.003 to 0.004 and the results of the experiments with rubber and other homogeneous insulating materials do not yet show, that a limit is attained, so that the conductivity of the insulating substance, which has been rendered conductive, should satisfy such a requirement, that the increase of tg δ, which is due to the loss of voltage in the conductive layers, does not amount to more than 0.0003 for example. The quotient between the energy and the wattless components may therefore not be greater than this value. The value of 0.0003 for the maximum permissible increase of tg δ was obtained by taking 10% of the tg δ of a good quality of insulating rubber, this value being 0.003.

Now three directions, in which the conductive layers have to carry the charging current of the cable may be distinguished. These three directions are:

1. The radial direction, that is the direction in the inner layer between conductor and insulation as well as in the outer layer between the insulation and the metallic sheath. This direction is only then exclusively present, if the current conductor as well as the metallic sheath lie along their entire surface completely against both conductive layers and are in complete contact with these layers. In this case the resistance of these layers is mainly determined by their thickness.

2. The circumferential direction, that is the direction along the line of juncture between the metallic conductor and the insulating material, which has been rendered conductive, in the circular cable section. This direction of current flow is present if the contact mentioned above between the metallic conductor and the conductive layer is not ideal, if therefore the current conductor fits somewhat loosely in the inner conductive layer and/or if the metallic sheath fits somewhat loosely over the outer conductive layer. The case may be such, that contact is only made along one line of the current conductor or of the metallic sheath. The increase of the losses is in this case determined, in addition to the thickness of the conductive layer, also by this circumference.

3. The longitudinal direction of the cable. This direction of flow occurs nearly exclusively in the outer layer, if no metallic earth sheath is present and the outer conductive layer is earthed, from point to point. The increase of losses in this case is not only determined by the thickness of the conductive layer, but also by the distance between the points, at which the layer is earthed. This direction of flow does not occur in threephase cables, in which the outer layers, which have been rendered conductive, lie against each other and are therefore in contact. The charging currents of the three single-conductor cables compensate. This direction of flow is very pronounced in cables with intermediary layers, that is to say with controlled voltage distribution in the dielectric. The conductivity of the intermediary layers should in this case be sufficient to smooth out the charging currents of the series connected unequal condensers.

A simple calculation provides in all three cases the maximum of the admissible specific resistance of the conductive material.

1. If for instance a cable for weak currents is taken, with a copper core of 2 mm. thickness, a layer of conductive rubber of 9 mm. thickness, a layer of insulating rubber of 17 mm. thickness, the increase of tg δ is to be calculated for a voltage of 100 kv. The charging current for 1 cm. of cable confirmed by experiment is approximately $6 \cdot 10^{-5}$ amperes, the resistance of the conductive rubber layer is about $0.3\,x$ (where $x$ equals resistance per cubic centimeter); the energy component of the voltage is then $1.8 \cdot 10^{-5}\,x$ volts and this may be equal to 0.0003 multiplied by 100,000=30 volts. The maximum value for $x$ is then about 1.5 megohms per cm³.

If this number is compared to the resistance of insulating rubber, viz. about $10^{15}$ to $10^{16}$ ohm per cm³., it will be seen directly that it will not be sufficient, even in this first most favorable case, to diminish the resistance of the insulating rubber, even if the decrease of resistance is important, and that rather a considerable conductivity is to be required.

2. If the same cable is provided with an outer layer of conductive rubber having a thickness of 0.1 mm., which is earthed along a generating line of the outer cylinder, the loading current of the dielectric material will have to traverse a path of about ¼ of the circumference of the cable section, before reaching earth. The resistance of this path for 1 cm. of cable amounts to $$x_2 \frac{\frac{1}{4}\pi 5.4}{0.01} \text{ ohm}$$

the cable diameter being 5.4 cm. and the thickness of the conducting layer being 0.01 cm., while $x_2$ is the specific resistance.

As the charging current of 1 cm. of cable is about $6 \cdot 10^{-5}$ amp., the tension (watt tension) will amount to $$6 \cdot 10^{-5} x_2 \frac{\frac{1}{4}\pi 5.4}{0.01} \text{ volt}$$

From the requirement that the maximum value of this tension is 30 volts it follows that the maximum specific resistance $$x_2 = 1175 \text{ ohm/cm}^3.$$

3. A third calculation for the flow of the charging currents in the longitudinal direction of the cable in the conductive outer layer produces as a requirement that the specific resistance be again much lower.

If the outer layer is earthed at intervals of 10 m. the charging current has to traverse about 2.5 m. through the conductive layer, before it reaches earth. The resistance of this path amounts to $$\frac{250}{\pi 5.4 \cdot 0.01} x_3 \text{ ohm}$$

if $x_3$ is the specific resistance.

Then the tension is $$500 \cdot 6 \cdot 10^{-5} \frac{250}{\pi 5.4 \cdot 0.01} x_3 \text{ volt}$$

this tension having a maximum value of 30 volts. Thus $x_3 = 0.7$ ohm/cm³.

If, however, the outer layer is earthed at intervals of 100 m. the maximum resistance of the outer layer will only be 0.007 ohm/cm³.

It has been shown by experiments, that a single conductor cable, covered by a normal extension method with lead as to the outer conductive layer may be pretty well ranged along the case mentioned under 2. The contact between the conductive layer and the lead sheath is of such nature, that in the mean, contact with earth should be reckoned to be present for one generating line. In particular after some use of the cable, the lead mantle will not fit closely around the insulation due to repeated expansions.

In all cases cited it is necessary, that the specific resistance of the conductive insulating material be in no case higher than 1 megohm per cm³.; besides it should be pointed out, that the maximum limit of the resistance should in nearly all practical cases be fixed at 1000 ohm per cm³.

The obtention of a low specific resistance is possible in two ways. In the first place the substances, which are to be added, may be chosen of a certain quality, quantity and in a certain combination. On this choice depend closely:
1. The plasticity of the conductive mixture:
2. The adhesion to the insulation.

Should the adhesion become insufficient, a second measure may be taken, viz. the sub-division of a conductive layer into small layers having an increasing conductivity as they near the metallic conductor.

As an example of mixing with a certain kind of conductive substance mixing with metallic powders may be mentioned.

The resistances, which may be obtained are of such a nature, that the flow of charging current is possible without inadmissibly high losses as well in the first cited case as in the second case. Such a low resistance, that the flow in the longitudinal direction of the cable would be possible, is not obtained however. Metallic (lead) sheath has therefore to be provided and it is not possible to provide intermediary sheaths.

An example of mixing with a certain quantity of a conductive substance is that of mixing with finely divided graphite. It has been proved that in the curve of the conductivity as a function of a percentage of graphite a sharp kink or break occurs at about 65%. At 60% the resistance values are considerably higher than is admissible; from 60% to 65% a rapid decrease in resistance occurs; at 65% lies about the value of resistance admissible for the flow of charging current in radial direction; at about 70% the value admissible for the axial direction. More than 70% may not be added without losing too much plasticity, tensile strength and elasticity. Flow of charging current in longitudinal direction is also not possible in this case.

As an example of the addition of a combination of substances the combination of graphite and lithopone should be mentioned. Experiments have shown that the addition of 50 to 55% of graphite and 10% of lithopone results in the same resistance as 65% graphite, the first mentioned kind of rubber showing however considerably improved properties.

The measure mentioned in the second instance; constituting the conductive layer from thin layers having increased conductibility results in the first place in a better mechanical adhesion between the insulation and the conductive insulation. The transition is more gradual the influence of the principal cause of the formation of hollow spaces viz. the difference in coefficient of expansion being thereby reduced. In the second place it renders possible the flow of charging current in longitudinal direction and the application of intermediary layers, a very low resistance being now attainable. In particular if metal powders are utilized the component layer with the lowest resistance may possess a quite elevated metal percentage, the adhesion onto the insulation being taken care of by the constituent thin layers with higher resistance.

In the extreme case, that is, when utilizing intermediary layers in long cable systems, the provision of spirally wound layers of sheet metal may be resorted to, these layers being followed on both sides by layers of conductive insulating material, the resistance of which gradually increases and merges into that of the dielectric. If the material is rendered conductive by the addition of metal powder the sheet metal is preferably chosen identical as the used metal powder.

It goes without saying that the auxiliary pieces united integrally to the system, in particular the cable junctions or boxes and the terminal boxes, should also be reckoned to belong to the cable. In general it is possible and preferable to construct the said auxiliary pieces in the identical manner as the cable, so that the different dielectric and conductive layers are continued in the junction and terminal boxes.

What I claim is:

1. A cable insulated with layers of homogeneous elastic insulating material, at least one of said layers of insulating material having been rendered conductive by having intimately incorporated therein a quantity of lithopone and a quantity of finely divided conductive substance and having a specific resistance of less than 1 megohm per cubic centimeter.

2. A cable comprising a central metallic conductor insulated with at least one layer of insulating rubber and comprising at least two layers of conducting rubber integrally united with said insulating rubber, at least one of said conducting rubber layers comprising rubber intimately mixed with a finely divided carbon and having a specific resistance of less than 1 megohm per cubic centimeter; the conductivity of said conducting rubber layers being different and said layers being so arranged that the conductivity of said layers increases from an outer insulating layer towards the metallic conductor.

3. In a high tension cable, an assembly of adjacent rubber layers comprising at least part of the insulation of said cable, said assembly comprising a first insulating rubber layer, a second adjacent layer of conducting rubber containing a finely divided conductive substance distributed therein and having a specific resistance not substantially greater than one megohm per cubic centimeter, and a third layer consisting of conducting rubber, adjacent said second layer, containing a finely divided conductive substance distributed therein and having a specific resistance of less than one megohm per cubic centimeter and less than that of said second layer; the assembly of rubber layers being integrally united.

4. The cable of claim 3 wherein the finely divided conductive substance is a carbon.

5. The cable of claim 3 wherein the finely divided conductive substance is a metal.

6. A cable insulated with rubber and comprising an assembly of at least three adjacent layers of conducting rubber, positioned between and united with layers of insulating rubber and having a specific resistance of less than 1 megohm per cubic centimeter, said layers of conducting rubber comprising rubber intimately mixed with at least 65 per cent of a finely divided carbon and being disposed in such manner that the specific resistances of the layers adjacent the insulating rubber layers is greater than that of the inner layers of said assembly.

DANIËL ALLARD COERT ZOETHOUT.